(12) United States Patent  
John

(10) Patent No.: US 11,933,344 B2
(45) Date of Patent: Mar. 19, 2024

(54) DOOR KNOB SCREW ALIGNMENT SLEEVE

(71) Applicant: Robert Kollker John, Evansville, IN (US)

(72) Inventor: Robert Kollker John, Evansville, IN (US)

(*) Notice: Subject to any disclaimer, the term of this patent is extended or adjusted under 35 U.S.C. 154(b) by 688 days.

(21) Appl. No.: 17/144,188

(22) Filed: Jan. 8, 2021

(65) Prior Publication Data

US 2021/0131467 A1 May 6, 2021

Related U.S. Application Data

(63) Continuation of application No. 15/932,460, filed on Feb. 28, 2018, now Pat. No. 10,907,672.
(60) Provisional application No. 62/604,992, filed on Jul. 28, 2017.

(51) Int. Cl.
F16B 5/02 (2006.01)
(52) U.S. Cl.
CPC ............. F16B 5/0233 (2013.01); *F16B 5/02* (2013.01)
(58) Field of Classification Search
CPC .. F16B 5/02; F16B 5/0233; E05B 1/00; E05B 1/0007; E05B 1/0015; E05B 1/0053; E05B 1/0061; E05B 1/0069; E05B 5/00; E05B 7/00

USPC ............. 411/535, 544–545, 546–547; 81/52; 16/412, 414, 433, 441
See application file for complete search history.

(56) References Cited

U.S. PATENT DOCUMENTS

| 1,419,979 | A | * | 6/1922 | John | F16B 13/061 411/38 |
| 1,431,176 | A | * | 10/1922 | John | F16B 13/06 411/38 |
| 4,657,456 | A | * | 4/1987 | Anquetin | F16B 37/02 411/61 |
| 5,108,243 | A | * | 4/1992 | Antonucci | H02G 3/18 220/3.7 |
| 6,532,629 | B2 | * | 3/2003 | Armstrong | E05B 3/06 292/355 |
| 6,719,509 | B1 | * | 4/2004 | Huang | F16B 13/124 411/61 |
| 2002/0088084 | A1 | * | 7/2002 | Armstrong | E05B 3/06 16/82 |
| 2004/0000795 | A1 | * | 1/2004 | Shen | E05B 55/005 292/336.3 |
| 2009/0282652 | A1 | * | 11/2009 | Maramba | E05B 13/005 16/441 |

* cited by examiner

Primary Examiner — Roberta S Delisle
(74) Attorney, Agent, or Firm — Barnes & Thornburg LLP

(57) ABSTRACT

A flexible compressible screw guide sleeve that facilitates door knob installations.

21 Claims, 7 Drawing Sheets

DOOR KNOB SCREW ALIGNMENT SLEEVE

CROSS REFERENCES TO RELATED APPLICATIONS

This application is a continuation of U.S. patent application Ser. No. 15/932,460 filed Feb. 28, 2018 and titled "Door Knob Screw Alignment Sleeve" which claims priority under 35 U.S.C. 119(e)(i) to U.S. provisional patent application 62/604,992 filed Jul. 28, 2017 with the same title, each of which is incorporated in its entirety by reference herein.

A portion of the disclosure of this disclosure for this patent document contains material to which claims for copyrights are made. The copyright owner has no objection to the facsimile reproduction of by anyone of the patent document or the patent disclosure, as it appears in the Patent and Trademark Office Patent file or records, but reserves all other copyrights whatsoever.

STATEMENTS AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

In the installation of door knobs on doors, many door knobs use two screws for attachment. The screws go through apertures in a base plate. The screws must line up with threaded apertures in mounting sleeves prior to securing a pair of door knobs together, in place. For most door knobs this alignment is difficult, as there is limited vision of the screws with relation to the apertures, and a source of wasted time and frustration for the door knob installer, in many instances.

This invention relates to a simple means of assisting in the process of the aforesaid alignment.

2. Background Information

In the installation of door knobs on doors, many door knobs use screws inserted through apertures in a base plate that must be lined up with threaded apertures in mounting sleeves prior to securing a pair of door knobs together, on a door. This alignment is often tedious, as there often is limited visibility of the location of the screws with respect to the apertures, and a source of wasted time and frustration for the installer of the door knob.

Often door knobs are installed on doors in new constructions, on hot days, before the air conditioning is installed.

As will be seen from the subsequent description of the preferred embodiments of the present invention, this present invention is to simplify the above named alignment.

SUMMARY OF THE INVENTION

The preferred embodiment of the present invention is the use of a flexible collapsible sleeve with a flared ends to enable the joining together of items such as, but not restricted to, door knobs.

DESCRIPTION OF THE PREFERRED EMBODIMENTS

Figure 1:
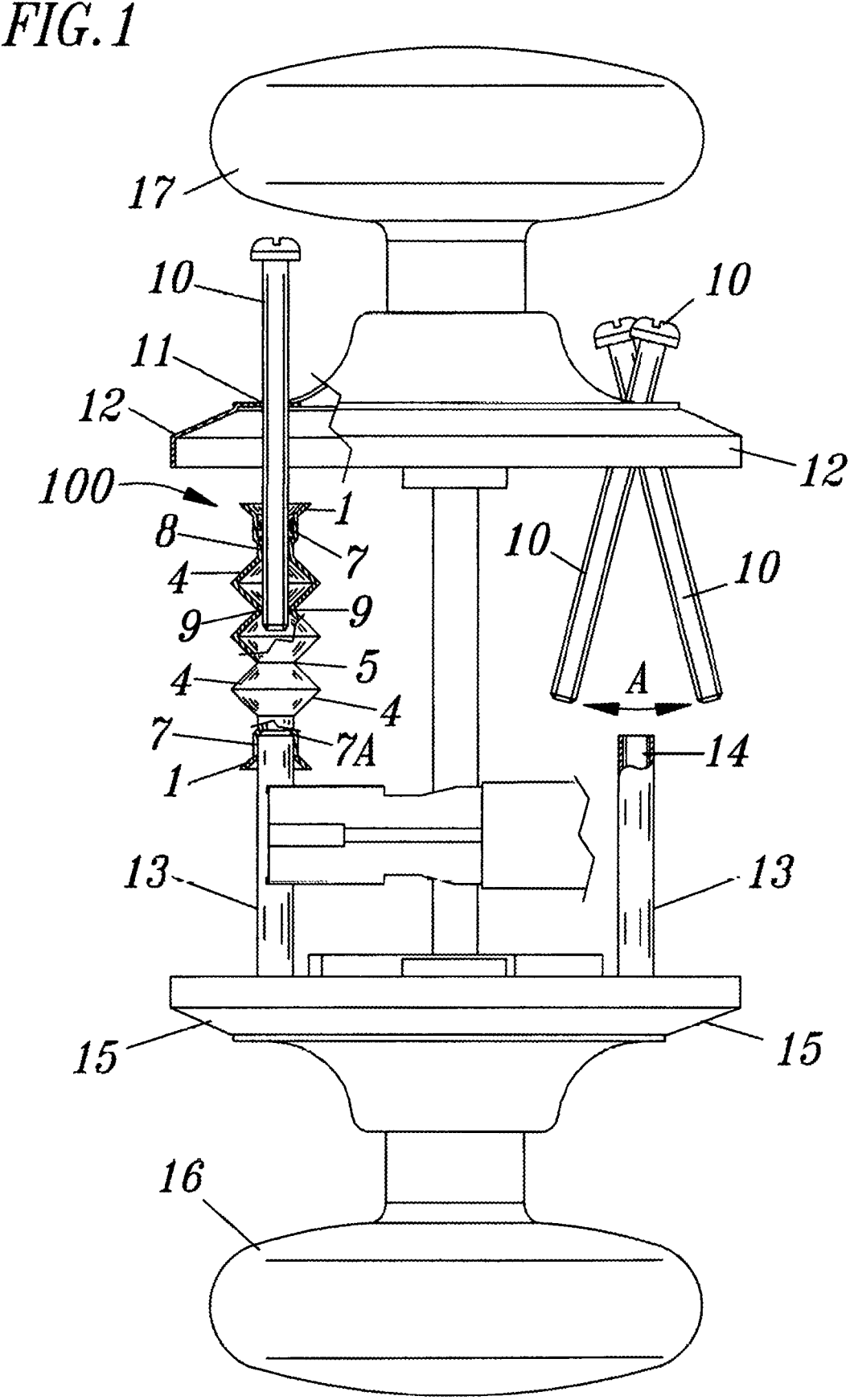
FIGS. 1 through 7 illustrate the preferred embodiment of the present invention, a door knob screw alignment sleeve.

Referring to FIGS. 1 through 7, a door knob screw alignment sleeve 100 comprises a screw boss cup 1, a screw boss guide 2, a screw guide 3, contraction members 4, contraction members junctions 5, load bearing surfaces 6, an internal alignment screw boss 7, with a screw guide stationary boss base guide load surface 7A, a stationary surface 8, and a screw guide sliding surface 9.

Referring to FIG. 1, an outside door knob 17 and an inside door knob 16 are shown with only one sleeve 100 to help understand what occurs without a sleeve 100 in place during installation of door knobs 16, 17. An installer of the door knobs 16, 17 often has limited visibility of both screws 10 with respect to threaded apertures 14 in each of screw bosses 13. As screws 10, without an installed sleeve 100 can vary as indicated by the dimension A, installation of door knobs can be quite tedious and frustrating, especially during the hot sunny days which are not uncommon in construction.

Also shown in FIG. 1 is one of the two apertures 11, an inside cover plate 12 and an outside cover plate 15.

Figure 2:
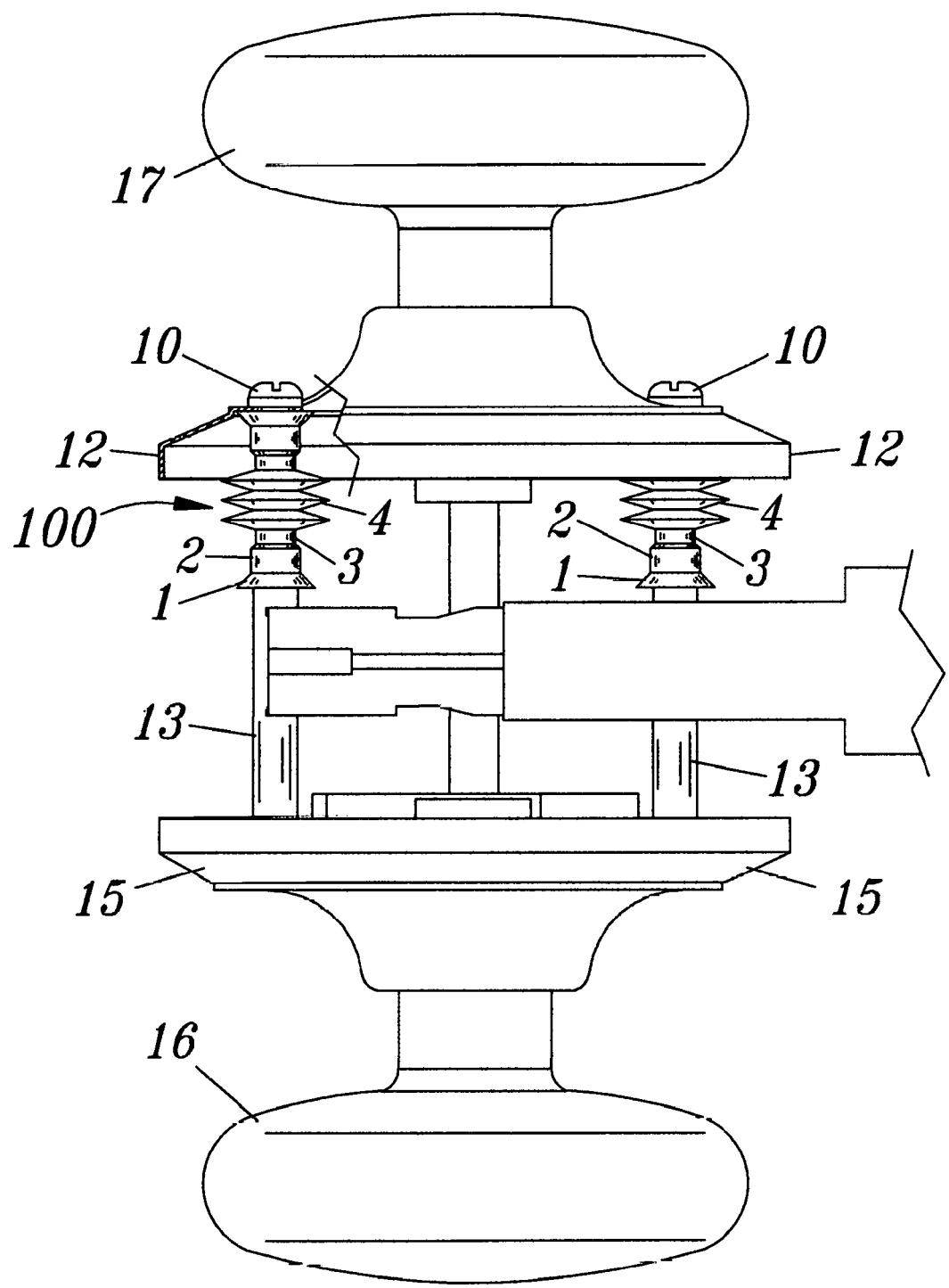
Figure 3:
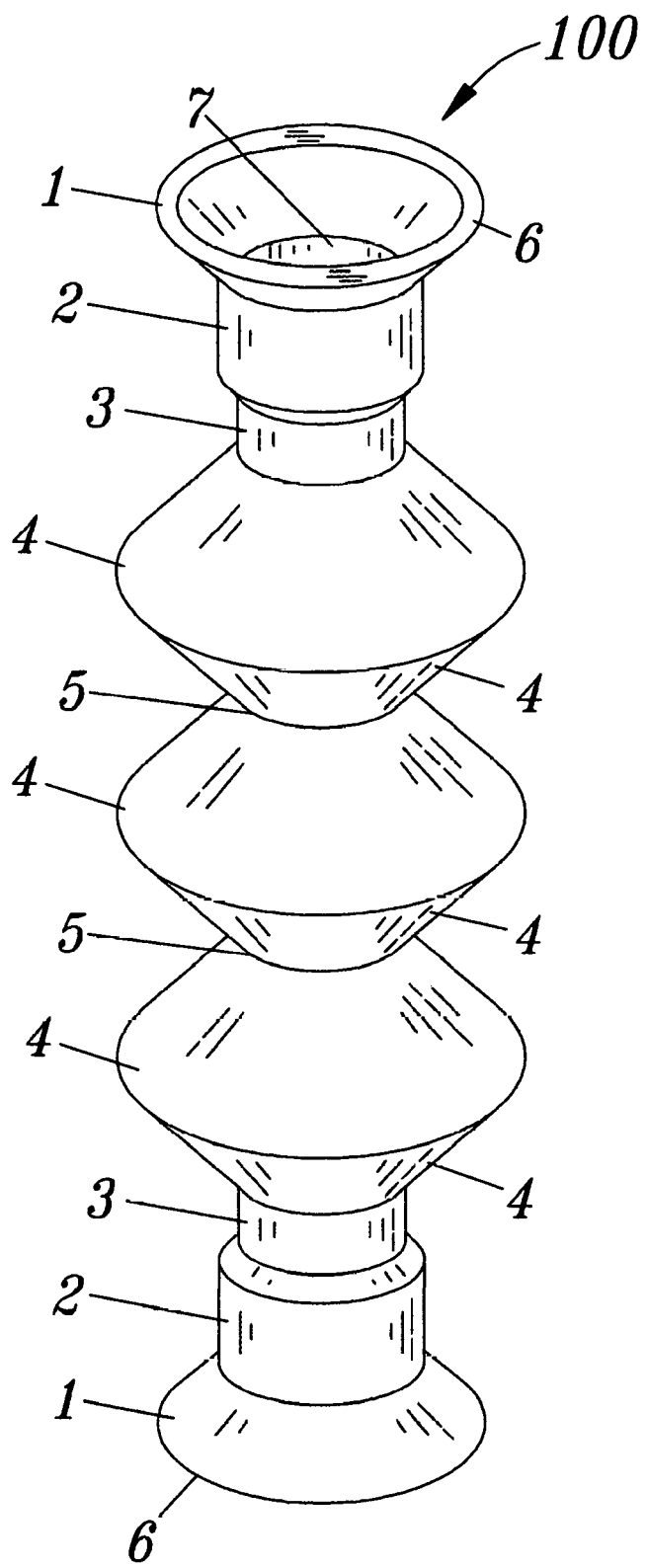
Figure 4:
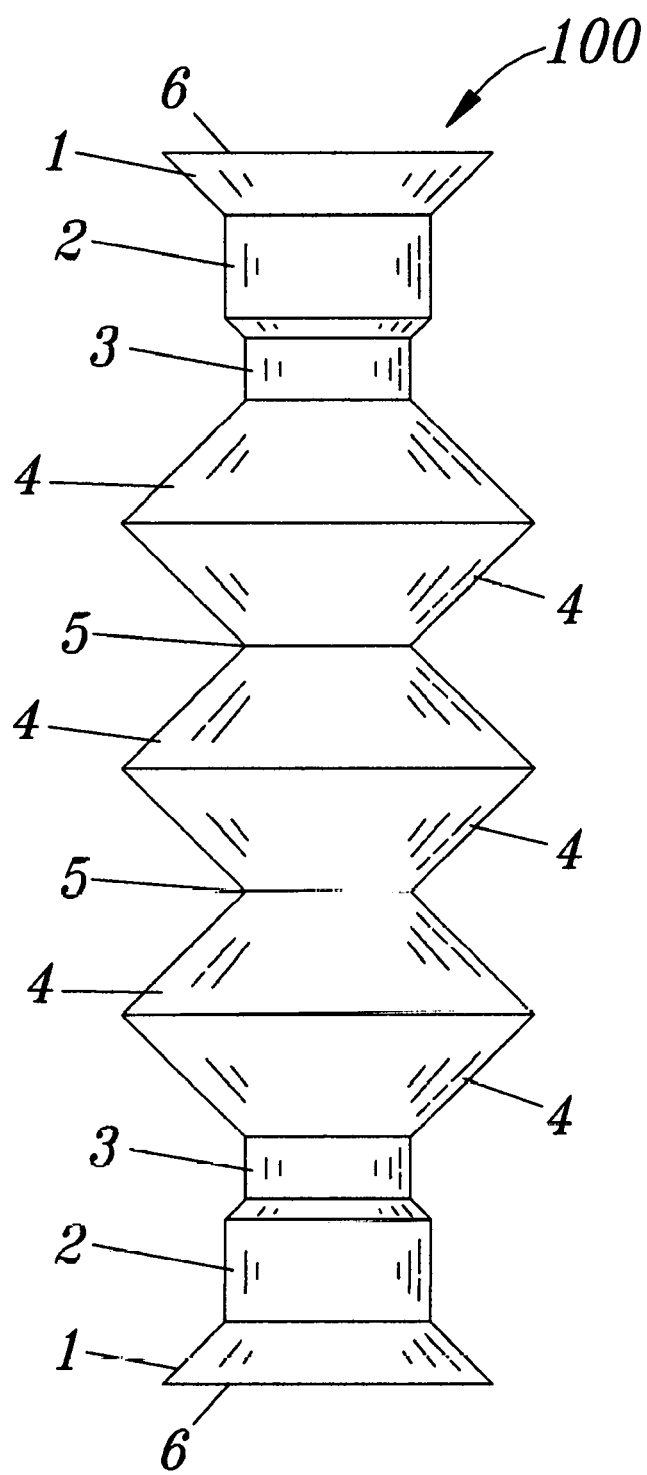
Figure 5:
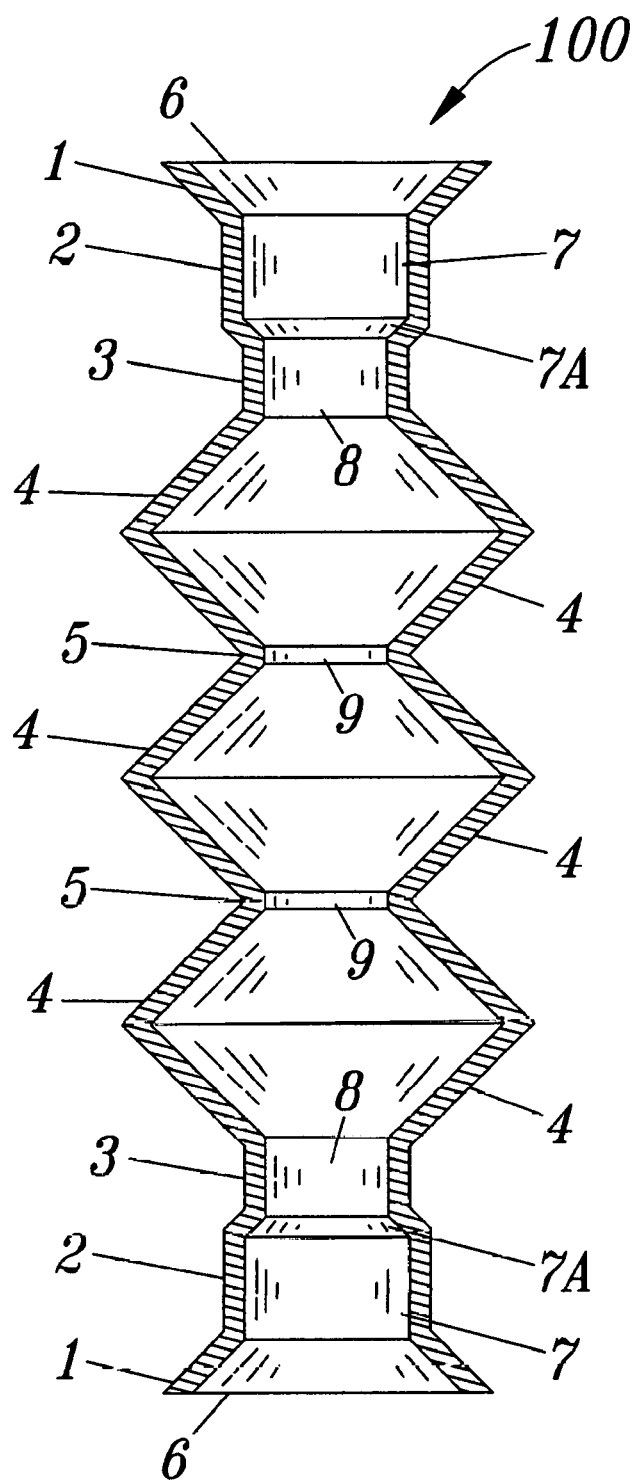

Referring to FIG. 2, the sleeve 1 00 is shown, as installed, compressed.

Figure 6:
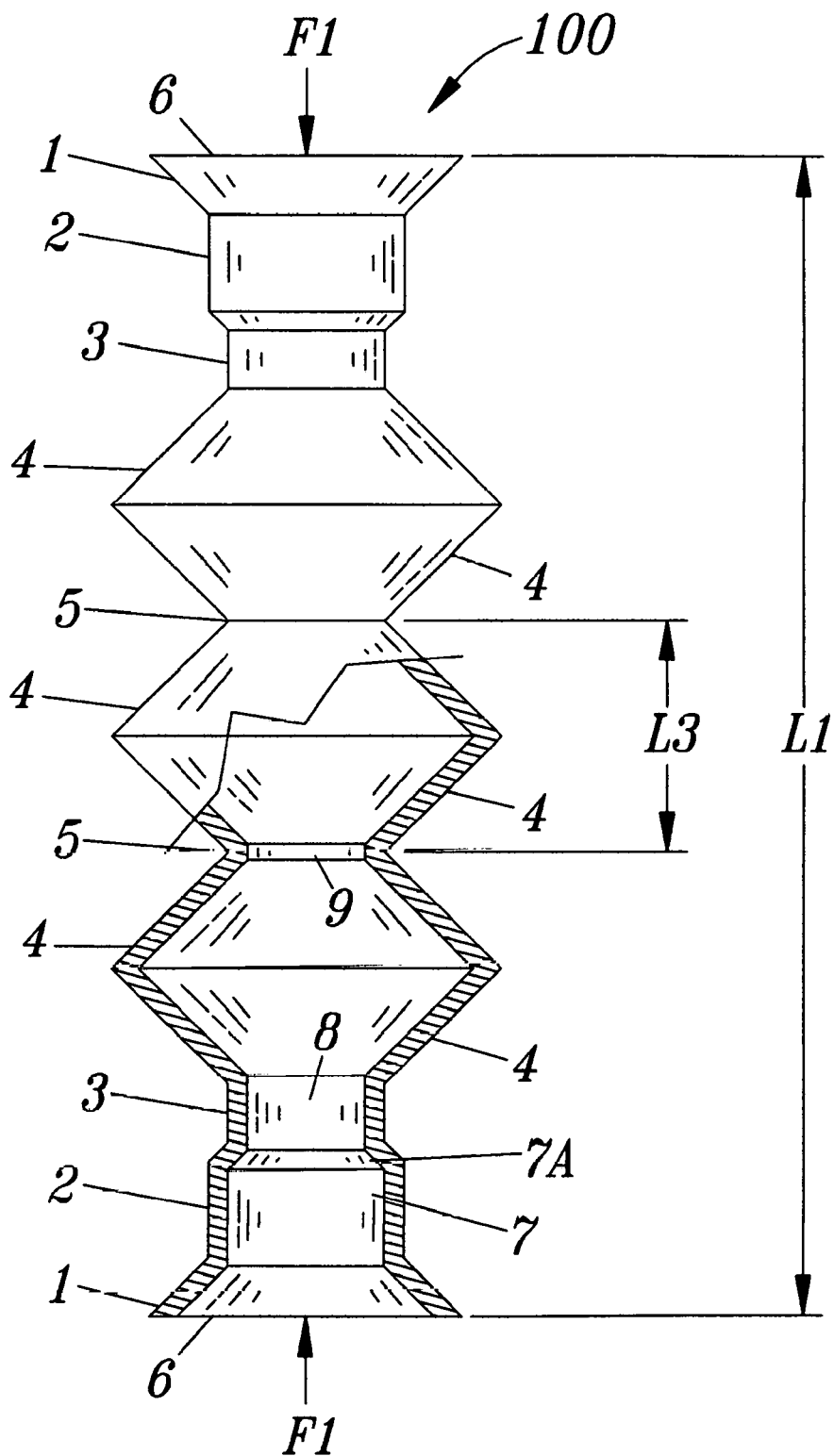

Referring to FIG. 6, a compression force direction F1 from the doorknobs 16 and 17 on the load bearing surfaces 6 is shown. Initial, uncompressed sleeve length L1 is also shown. Initial length L3 of uncompressed pairs of contraction members 4 with their respective junctions 5 is also shown.

Figure 7:
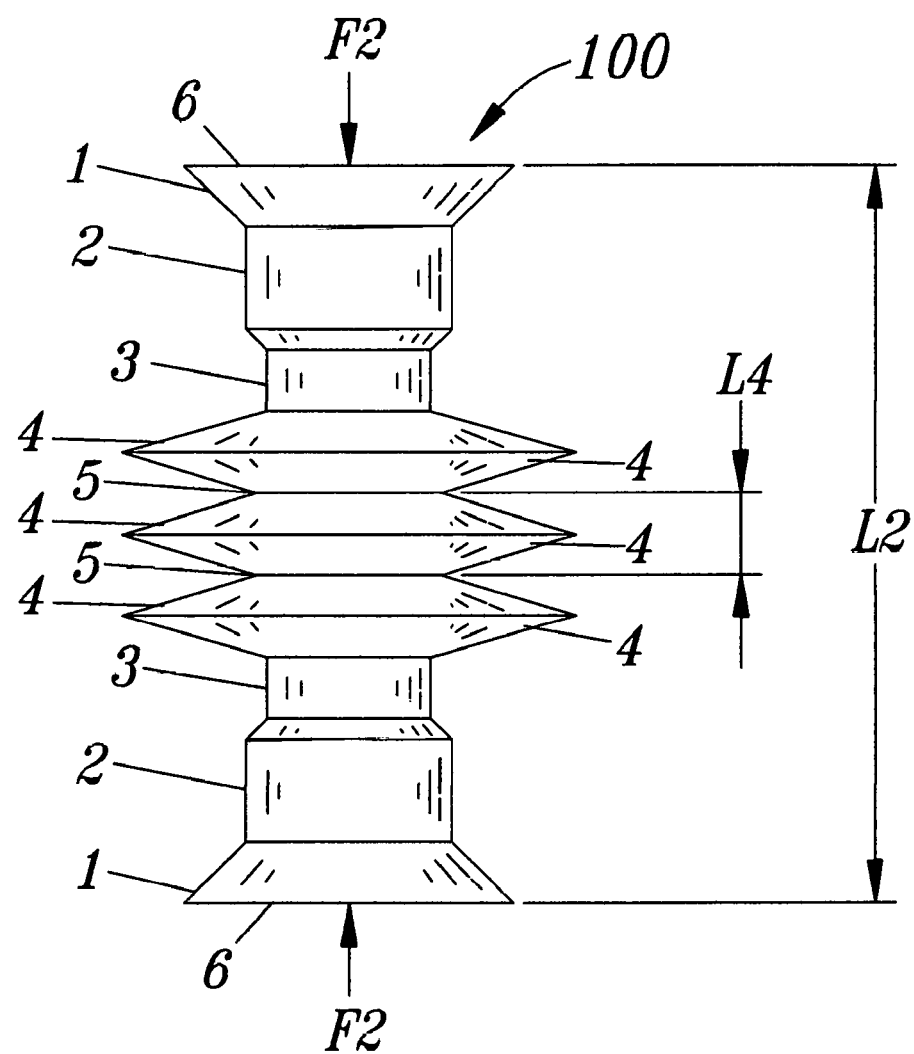

Referring to FIG. 7, a compressed sleeve length L2 from the final compression of the sleeve 100 upon completion of the assembly of the door knobs 16, 17.

Each screw 10 is tightened, securely fastening the door knobs 16, 17, together, in position. Each sleeve 100 is left in place, having served its purpose.

For purposes of enablement, in the preferred embodiment of the present invention, the sleeve 100 material is of a flexible compressible material, such as, but not restricted to an elastomer or a cross-linked polymer.

Although the descriptions above contain many specificities, these should not be construed as limiting the scope of the invention, but as merely providing illustrations of some of the preferred embodiments of the present invention.

It will be obvious to those skilled in the art that modifications may be made to the embodiments described above without departing from the scope of the present invention. Thus the scope of the invention should be determined by the appended claims in the formal application and their legal equivalents, rather than by the examples given.

The invention claimed is:
1. A door knob assembly comprising
a first door knob including a cover plate having a pair of apertures,
a second door knob including a cover plate having a pair of screw bosses, the screw bosses having internal threads,
a pair of screws positionable through the pair of apertures of the cover plate of the first door knob, and
a pair of alignment sleeves, each alignment sleeve to receive one of the screws and engage one of the screw bosses of the cover plate of the second door knob, each alignment sleeve including:
  a resiliently and flexibly collapsible body, the resiliently and flexibly collapsible body having a longitudinal length defining a longitudinal axis and a plurality of contraction members,
  a first end that includes a guide configured to engage a screw of the pair of screws to align the screw along the longitudinal axis,
  a second end that includes an alignment cup configured to engage a screw boss of the pair of screw bosses to align the alignment sleeve with the screw boss to guide the screw to engage threads of the screw boss as the first door knob is aligned with the second door knob,
  wherein the alignment sleeve collapses longitudinally to reduce the longitudinal length of the collapsible body such that each contraction member is resiliently collapsed as the screw associated with the alignment sleeve is threaded into the screw boss and draws the first door knob closer to the second door knob.

2. The door knob assembly of claim 1, wherein the first end of the alignment sleeve forms a conical screw cup having a first diameter at the distal edge of the first end, the screw cup centered on the longitudinal axis and narrowing to a smaller second diameter that defines an entry to a passageway through the collapsible body.

3. The door knob assembly of claim 2, wherein the second end of the alignment sleeve forms a conical screw cup having a first diameter at the distal edge of the second end, the screw cup centered on the longitudinal axis and narrowing to a smaller second diameter that defines the entry to the passageway through the collapsible body.

4. The door knob assembly of claim 1, wherein the collapsible body comprises a bellows structure.

5. The door knob assembly of claim 1, wherein the collapsible body comprises a flexibly compressible material.

6. The door knob assembly of claim 1, wherein the collapsible body comprises an elastomer.

7. The door knob assembly of claim 1, wherein the collapsible body comprises a cross-linked polymer.

8. The door knob assembly of claim 1, wherein the contraction members are positioned along the longitudinal length of the collapsible body, a contraction member junction positioned at the intersection of adjacent contraction members, each contraction member junction having a first diameter defining an inner diameter of a passageway through the alignment sleeve.

9. The door knob assembly of claim 8, wherein the reduction in the longitudinal length of the collapsible body causes each contraction member to be collapsed and each contraction member junction to move along the longitudinal axis as adjacent contraction members contract.

10. The door knob assembly of claim 9, wherein the first end forms a conical screw cup having a first diameter at the distal edge of the first end, the screw cup centered on the longitudinal axis and narrowing to a smaller second diameter that defines an entry to the passageway through the collapsible body.

11. The door knob assembly of claim 10, wherein the second end forms a conical screw cup having a first diameter at the distal edge of the second end, the screw cup centered on the longitudinal axis and narrowing to a smaller second diameter that defines the entry to the passageway through the collapsible body.

12. The door knob assembly of claim 11, wherein the collapsible body comprises a bellows structure.

13. The door knob assembly of claim 11, wherein the collapsible body comprises an elastomer.

14. The door knob assembly of claim 11, wherein the collapsible body comprises a cross-linked polymer.

15. An assembly comprising
  a moving structure including a cover plate having a pair of apertures,
  a fixed structure including a pair of screw bosses, the screw bosses having internal threads,
  a pair of screws positionable through the pair of apertures of the cover plate, and
  a pair of alignment sleeves, each alignment sleeve to receive one of the screws and engage one of the screw bosses, each alignment sleeve including:
    a resiliently and flexibly collapsible body, the resiliently and flexibly collapsible body having a longitudinal length defining a longitudinal axis and a plurality of contraction members,
    a first end that includes a guide configured to engage a screw of the pair of screws to align the screw along the longitudinal axis,
    a second end that includes an alignment cup configured to engage a screw boss of the pair of screw bosses to align the alignment sleeve with the screw boss to guide the screw to engage the threads of the screw boss as the moving structure is aligned with the fixed structure,
    wherein the alignment sleeve collapses longitudinally to reduce the longitudinal length of the collapsible body such that each contraction member is resiliently collapsed as the screw associated with the alignment sleeve is threaded into the screw boss and draws the moving structure toward the fixed structure.

16. The assembly of claim 15, wherein the first end of the alignment sleeve forms a conical screw cup having a first diameter at the distal edge of the first end, the screw cup centered on the longitudinal axis and narrowing to a smaller second diameter that defines an entry to a passageway through the collapsible body.

17. The assembly of claim 16, wherein the second end of the alignment sleeve forms a conical screw cup having a first diameter at the distal edge of the second end, the screw cup centered on the longitudinal axis and narrowing to a smaller second diameter that defines the entry to the passageway through the collapsible body.

18. The assembly of claim 15, wherein the contraction members are positioned along the longitudinal length of the collapsible body, a contraction member junction positioned at the intersection of adjacent contraction members, each contraction member junction having a first diameter defining an inner diameter of a passageway through the alignment sleeve.

19. The assembly of claim 18, wherein the reduction in the longitudinal length of the collapsible body causes each contraction member to be collapsed and each contraction member junction to move along the longitudinal axis as adjacent contraction members contract.

20. The assembly of claim 19, wherein the first end of the alignment sleeve forms a conical screw cup having a first diameter at the distal edge of the first end, the screw cup centered on the longitudinal axis and narrowing to a smaller second diameter that defines an entry to the passageway through the collapsible body.

21. The assembly of claim 20, wherein the second end of the alignment sleeve forms a conical screw cup having a first diameter at the distal edge of the second end, the screw cup centered on the longitudinal axis and narrowing to a smaller second diameter that defines the entry to the passageway through the collapsible body.

\* \* \* \* \*